No. 683,668. Patented Oct. 1, 1901.
N. H. SUREN.
ELECTRICAL MEASURING INSTRUMENT.
(Application filed Feb. 16, 1901.)
(No Model.)
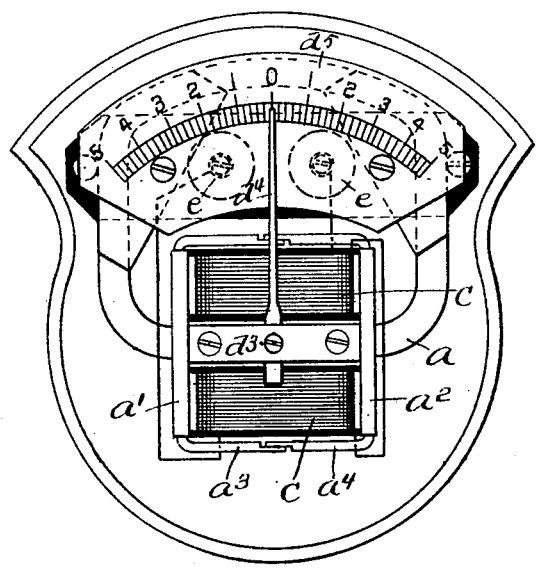
Fig-1-
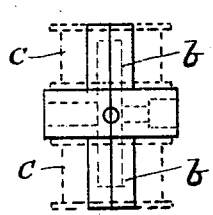
Fig-5-
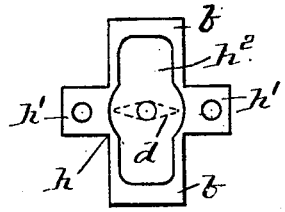
Fig-7-
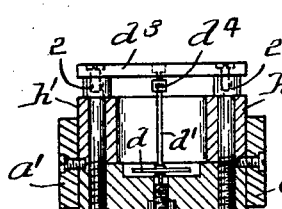
Fig-6-
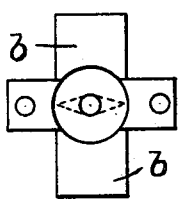
Fig-9-
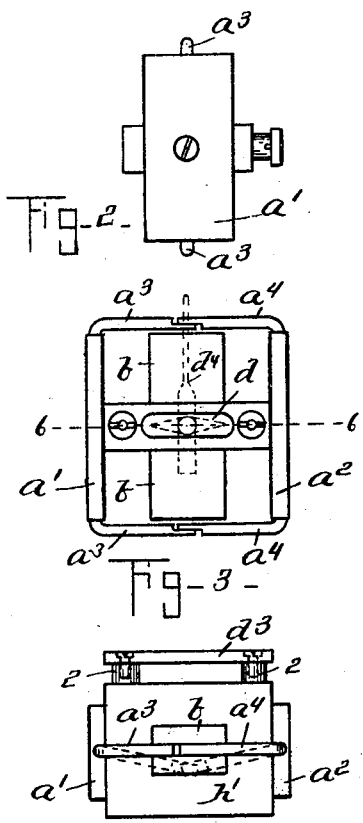
Witnesses:
H. B. Davis
B. I. Russell.
Inventor:
Nathan H. Suren
by B. J. Hayes
Atty.

UNITED STATES PATENT OFFICE.

NATHAN H. SUREN, OF NEEDHAM, MASSACHUSETTS, ASSIGNOR TO GAME-WELL FIRE ALARM TELEGRAPH COMPANY, OF NEW YORK, N. Y.

ELECTRICAL MEASURING INSTRUMENT.

SPECIFICATION forming part of Letters Patent No. 683,668, dated October 1, 1901.

Application filed February 16, 1901. Serial No. 47,585. (No model.)

*To all whom it may concern:*

Be it known that I, NATHAN H. SUREN, of Needham, county of Norfolk, State of Massachusetts, have invented an Improvement in Electrical Measuring Instruments, of which the following description, in connection with the accompanying drawings, is a specification, like letters on the drawings representing like parts.

This invention relates to electric-current-measuring instruments, and has for its object to provide means for regulating the magnetic field containing the magnetized needle and the conducting-coils which are connected with the wire carrying the current to be measured, whereby the movements of the pointer may be better controlled, and also to improve and simplify the construction of the instrument in several particulars.

The current-measuring instrument in which my invention is embodied comprises, essentially, a permanent magnet, a magnetized needle contained in the magnetic field of said permanent magnet and carrying the pointer, and two conducting-coils of wire adapted to be connected with the wire carrying the current to be measured, mounted on suitable cores and also contained in the magnetic field of said permanent magnet, said coils being disposed at right angles to the lines of force of the permanent magnet. In accordance with this invention the poles of the permanent magnet are bridged together by two magnetic conductors, which form an inclosure for the coils and the needle, there being one magnetic conductor on each side of the needle, and said magnetic conductors are each made adjustable in order that their resistance may be varied, such adjustment being herein represented as accomplished by varying the cross-sectional area of the conductors. The point at which the adjustment is made is in a line crossing the axis of the needle and running at right angles to the lines of force of the permanent magnet. These magnetic conductors present two paths for the lines of force around the needle, which may be varied by adjustment, and they also serve as a shield for the needle as against external magnetic influences.

Figure 1 shows in front elevation an electric-current-measuring instrument embodying this invention. Fig. 2 is a detail showing a side view of one of the pole-pieces and parts connected thereto. Fig. 3 is a detail showing a front view of said pole-pieces and parts connected thereto. Fig. 4 is a detail showing an end view of the pole-pieces and parts connected thereto. Figs. 5 to 8 are details showing the parts forming the cores on which the coils are mounted and the chamber which contains the magnetized needle, and Fig. 9 is a modified form of support for the coils and chamber for the needle.

$a$ represents the permanent magnet, and $a'$ $a^2$ its pole-pieces, which, as herein shown, are represented as oblong plates. The pole-pieces are bridged together by magnetic conductors at each end. The magnetic conductors are made alike, or substantially so, and, as herein shown, each consists of two pins $a^3$ $a^4$, swiveled or pivotally connected at one end respectively to the pole-pieces, the opposite ends of said pins being made so as to overlap each other at a point substantially midway between the two pole-pieces. These magnetic conductors are regulated in various degrees by moving the parts $a^3$ $a^4$ more or less relatively to each other into and out of a straight line, as indicated by dotted lines, Fig. 4, thereby varying the cross-sectional area of the conductors and correspondingly increasing or decreasing the resistance. These magnetic conductors unite the poles of permanent magnets, giving two paths for the lines of force around the needle and serve as a means of regulating the amount of lines of force passing through the needle.

$b$ $b$ represent the cores for the conducting-coils $c$ $c$, and said cores are made of non-magnetic material and disposed in alinement, and between said cores a chamber is provided for the magnetic needle $d$, the walls of which are formed integral with said cores $b$ $b$. The cores $b$ $b$ and parts connected thereto, which form the chamber for the needle $d$, may be divided longitudinally in two parts, (see Figs. 5 to 8,) and said parts, which may be simply castings, will be secured together by screws 2 or otherwise. Referring to Fig. 7, one of the parts, as $h$, is shown, which consists of a substantially rectangular piece of metal having a lateral projection $h'$ at each side substantially midway its length and having an oblong recess $h^2$; and, referring to Fig. 8, the other part, as $h^3$, is shown, which is similarly constructed, having a lateral projection $h^4$ at each side and having an oblong recess $h^5$, and also having an opening $h^6$, which communicates with the chamber formed by the two oblong recesses $h^2$ $h^5$. Referring to Fig. 9, the cores are shown as made integral with the intermediate piece, and the latter is bored out to present a chamber for the needle.

The needle $d$ is secured to a shaft or spindle $d'$, mounted on a suitable step $d^2$ and having its upper end bearing in a plate $d^3$, secured to the screws 2, and to said shaft or spindle a hand or pointer $d^4$ is secured, which is adapted to travel over a suitable dial $d^5$. (Shown in Fig. 1.)

The wires leading from the conducting-coil $c$ are connected to the terminal posts $e$ $e$, which are adapted to be connected to the wire carrying the current to be measured.

I claim—

1. In an electric-current-measuring instrument, a permanent magnet having its poles bridged together by two magnetic conductors, combined with a magnetized needle contained in the magnetic field, and inclosed by said magnetic conductors, a pointer carried by said needle, and coils of wire adapted to be connected with the wire carrying the current to be measured also contained in said magnetic field, and inclosed by said magnetic conductors, substantially as described.

2. In an electric-current-measuring instrument, a permanent magnet having its poles bridged together by two adjustable magnetic conductors, combined with a magnetized needle contained in the magnetic field, and inclosed by said conductors, a pointer carried by said needle, and coils of wire adapted to be connected with the wire carrying the current to be measured also contained in said magnetic field and inclosed by said magnetic conductors, substantially as described.

3. In an electric-current-measuring instrument, a permanent magnet having its poles bridged together by two adjustable magnetic conductors, combined with a magnetized needle contained in the magnetic field and inclosed by said conductors, a pointer carried by said needle, and coils of wire adapted to be connected with the wire carrying the current to be measured also contained in said magnetic field and inclosed by said magnetic conductors, the points of adjustment of said magnetic conductors being in a line crossing the axis of the needle shown and at right angles to the lines of force of said permanent magnet, substantially as described.

In testimony whereof I have signed my name to this specification in the presence of two subscribing witnesses.

NATHAN H. SUREN.

Witnesses:
B. J. NOYES,
H. B. DAVIS.